United States Patent Office 3,144,430
Patented Aug. 11, 1964

3,144,430
POLYPROPYLENE FILM AND METHOD OF MAKING
Albert N. Schaffhausen, St. Paul, Minn., assignor to Minnesota Mining and Manufacturing Company, St. Paul, Minn., a corporation of Delaware
No Drawing. Filed Oct. 9, 1961, Ser. No. 143,575
5 Claims. (Cl. 260—45.5)

This invention relates to polymer compositions comprising biaxially orientable blends of crystalline polypropylene and crystalline poly(vinyl methyl ether), to films formed from such blends, and to coated products made from the films.

Isotactic polypropylene, a polymer made by the "low pressure" polymerization of propylene in the presence of a catalyst which is either a supported transition metal oxide or a transition metal halide with an organo-metallic compound of a metal from Groups I–III of the periodic table, is a recently developed product having unusually attractive physical characteristics. Films formed from this material are clear and sparkling, and the product has remarkable resistance to a wide variety of organic and inorganic solvents. In comparison with linear polyethylene—of which it is the simplest "stereo-regulated" homologue—isotactic polypropylene has a lower density, a higher melting point and a greater tensile strength.

The orientation of linear polymers to increase their tensile strength and to improve other physical properties is well known. It is also known that films of linear polyethylene and such stereo-regulated homologues as isotactic polypropylene can be molecularly oriented with a resultant increase in tensile strength and other physical properties. Prior to my invention, however, biaxial orientation has been extremely difficult to carry out. To illustrate, the tensile strength of an extruded but otherwise unoriented isotactic polypropylene film is about 6,000 p.s.i., the tensile strength of compression molded films being somewhat lower. Although such films can be oriented to a tensile strength of perhaps 40,000 p.s.i. in one direction, any bi-directional orientation process is limited to the production of a low caliper film with a high percentage of wasted material because of the occurrence of "line orientation." In "line orientation" the film does not reduce evenly in caliper but is pulled down to its ultimate oriented thickness (on the order of one-half mil or less) along the edge of a thick section of substantially unoriented material. When this phenomenon occurs, it is difficult to obtain a useful quantity of uniform caliper film of any thickness, and it becomes almost impossible, practically, to prepare a biaxially oriented film having a thickness as great as, e.g., one mil. Stretching the film first in one direction and then, in a second step, in another direction results in film with non-uniform properties. Similar results are observed when film expanded as a tube is drawn in a longitudinal direction. Other processes have been described for simultaneously stretching sections of film in two mutually perpendicular directions, but either only a small amount of stretch can be achieved or the final product is a low caliper film, e.g., one-half mil.

Belgian Patent No. 572,425 suggests orienting isotactic polypropylene film by heating it above its melting point, cooling to a narrow temperature range slightly below the melting point, stretching, and thereafter cooling while maintaining the film under tension. Although this process can be made to work on a laboratory scale, the rapidity with which isotactic polypropylene crystallizes below its melting point makes control very difficult and hence the above described problems of stretching crystalline material are again encountered. I am aware of no technique prior to my invention which renders the production of uniform caliper biaxially oriented poly-alpha-olefin films having a thickness on the order of one mil, especially isotactic polypropylene films, commercially feasible.

I have now devised a means whereby isotactic polypropylene is rendered biaxially orientable while still maintaining its desirable strength and similar physical characteristics. Biaxially oriented films which have a predetermined uniform thickness of, e.g., one mil or more can be made with a minimum amount of waste and without the occurrence of significant line orientation. Films made according to my invention are particularly useful for the fabrication of normally tacky and pressure-sensitive adhesive tapes employing the films as backings. The high degree of transparency of many films prepared in accordance with my invention makes them especially suitable for use as replacements for cellophane, the films having a desirable degree of stiffness and being capable of orientation to uniform thicknesses corresponding to that in which cellophane is normally available commercially. In many instances the films also possess superior electrical properties. Other uses for products embodying my invention will readily occur to persons skilled in the art who read this description.

In accordance with my invention, crystalline isotactic polypropylene is modified by blending with it minor quantities of crystalline poly(vinyl methyl ether), the latter constituting on the order of from 5–35% by weight of the total polymer present. Blends falling within the range just indicated maintain most of the characteristics exhibited by isotactic polypropylene but are capable of being formed into a film which can be biaxially oriented. Generally speaking, I prefer blends which contain on the order of from 5–15% crystalline poly(vinyl methyl ether), additional amounts of the additive apparently adding very little to the orientability of the blend and decreasing the ultimate strength attainable. Surprisingly, amorphous poly(vinyl methyl ether) has no apparent effect on the stretching characteristics of isotactic polypropylene.

The following examples, in which all parts are by weight unless otherwise noted, will serve to illustrate the nature of my invention but are not intended to be limiting in any way.

Example I

Ninety-five parts of "Pro-fax" No. 6511 polypropylene molding powder were blended with 5 parts of crystalline poly(vinyl methyl ether) on a two-roll rubber mill at 360–380° F., approximately 0.167 of 4,4'-thiobis(3-methyl-6 tertiary butyl phenol) antioxidant ("Santonox") and 0.333 part of calcium stearate being added as processing aids. "Pro-fax" molding powder is an isotactic material having a density of 0.90 gram per cubic centimeter, a melting point of 340° F. and a crystallinity of about 65%, sold by the Hercules Powder Company. The crystalline poly(vinyl methyl ether) was supplied in the form of light tan thermoplastic granules having a specific gravity of 1.08 and a melting point (measure by loss of birefringence) of 260° F.; the product is soluble in chlorinated solvents and aromatic hydrocarbons. Tensile strength of a compression molded film is about 2,500–3,000 p.s.i. Although essentially insoluble in aliphatic hydrocarbons, fats and oils, glycerine, and water, it absorbs approximately moisture and water. As employed in this example the poly(vinyl methyl ether), which was obtained from the Hercules Powder Company, contained 0.170 dialkyl phenol-sulfide ("Santowhite") stabilizer.

Blending of the components described in the preceding paragraph was continued until a smooth band was formed, after which the blend was compression molded to form a sheet having a thickness of 32 mils, a tensile strength of approximately 4,400 p.s.i. and an ultimate elongation of about 600%. A 2″ x 2″ sample was cut from the sheet and gripped at all four sides by a small film stretching device. The entire assembly was then placed in a circulating air oven and allowed to reach equilibrium at about 300° F. Opposite sides of the clamped film were then simultaneously moved apart in two mutually perpendicular directions at a constant rate of 600% per minute until the area of the film was increased on the order of 20-fold, i.e., until the dimensions of the film were approximately 9″ x 9″. The biaxially stretched film was then rapidly cooled to room temperature while being held under tension, after which the thickness was found to be approximately 0.85–1.0 mil. By way of contrast, a 30 mil sheet of unmodified isotactic polypropylene stretched under identical conditions yields film ranging from 0.8–0.9 mil in thickness at the oriented areas to substantially its original thickness at the many sections which remain unoriented.

The tensile strength of the oriented film of this example was 18,000 p.s.i. at an ultimate elongation of 60% in one direction and 25,400 p.s.i. at an ultimate elongation of 82% in a direction perpendicular thereto. The film had a degree of line orientation which may be classified as 3½ on a scale where 5 represents the severe line orientation achieved with unmodified isotactic polypropylene under identical conditions and 0 represents what may be termed "area orientation," or the complete lack of line orientation. Clarity was outstanding, and although the degree of line orientation was threshold in nature, the finished product was suitable for the manufacture of transparent pressure-sensitive adhesive tape. It was noted that the receptivity of this film for printing ink was substantially better than that of unmodified isotactic polypropylene, making it possible to use the product for transparent labeling tape.

Although the high tensile strength of the product of Example I is desirable, it is important in many instances to reduce the degree of line orientation still further. The following examples illustrate compositions which achieve this result.

*Example II*

A 90:10 blend of isotactic polypropylene:crystalline poly(vinyl methyl ether), as described in Example I, were blended in the same manner described in Example I. A 26 mil sheet formed from the polymer blend was biaxially oriented at 310° F. with a stretch ratio of 4.45:1 in each direction, the final film thickness was approximately one mil. The tensile strength was 12,600 p.s.i. at 140% elongation, average values in two mutually perpendicular directions. The film was extremely clear and displayed a degree of line orientation rated at 3 on the same scale referred to in Example I. Dielectric strength was found to be 10,700 volts per mil (determined according to ASTM test D1000–59T), surprisingly over 70% higher than the value obtained for unmodified isotactic polypropylene film of the same thickness.

*Example III*

A 2:1 blend of the polypropylene and poly(vinyl methyl ether) polymers described in the preceding example was prepared in the same manner described in Example I. A 2″ x 2″ x 28 mil sheet stretched in mutually perpendicular directions at a stretch ratio of 4.45:1 attained a final thickness of 1.7 mils, having a tensile strength of 11,100 p.s.i. approximately 70% ultimate elongation in mutually perpendicular directions. The biaxially oriented film displayed still greater freedom from line orientation than the product of Example II being rated 2 on the scale referred to in Example I. Evidence of some incompatibility in the components was apparent, the film displaying a pronounced silvery effect which greatly reduced its clarity. The addition of substantially greater amounts of poly(vinyl methyl ether) to the polypropylene results in a blend in which this silvery incompatibility effect is even more apparent upon attempts to effect biaxial orientation. Further, tensile strength of such films decreases sharply, and they are hence not well suited for the accomplishment of the purposes of my invention. Since the silvery appearance is believed to be the result of included air and since this film showed some tendency to absorb moisture at high humidities, the electrical properties are felt to be somewhat inferior to those of Examples I and II. Receptivity to ink and coating materials, however, is even better than that of films containing smaller amounts of the crystalline poly(vinyl methyl ether).

Biaxially oriented films prepared in accordance with any of the preceding examples may be coated directly with a 95:5 isooctyl acrylate:acrylic acid copolymer in ethyl acetate solvent as disclosed in Ulrich U.S. Reissue Patent No. 24,906, to provide a pressure-sensitive adhesive tape suitable for a variety of known uses. Somewhat greater adhesion of the pressure-sensitive adhesive to the backing may be obtained if the film is first subjected to corona discharge at reduced pressure, flame treatment, surface abrasion, or surface oxidation with strong inorganic oxidizing agents, techniques which are all well known to those skilled in the art in connection with polyethylene and other films.

Numerous variations in composition, processing and application will readily occur to those skilled in the art. Accordingly, I do not intend to be limited other than by the scope of the appended claims.

What I claim is:
1. A method of preparing with minimum waste a polymeric film having a uniform thickness and a tensile strength in mutually perpendicular directions exceeding that of unoriented isotactic polypropylene, comprising the steps of intimately blending from 5 to 35 parts of crystalline poly(vinyl methyl ether) and correspondingly from 95 to 65 parts of isotactic polypropylene, forming sheet material from the blended polymers, heating said sheet material to a temperature slightly below its melting point, and biaxially orienting said sheet material.

2. A uniform physical blend of polymers consisting essentially of from 95 to 65 parts of crystalline polypropylene and correspondingly from 5 to 35 parts of crystalline poly(vinyl methyl ether), a film formed from said blend being readily biaxially orientable to a product having a uniform thickness on the order of 1 mil and a tensile strength in mutually perpendicular directions greatly exceeding that of unoriented isotactic polypropylene.

3. A biaxially oriented film having uniform thickness and a tensile strength exceeding that of unoriented isotactic polypropylene, comprising an intimate blend of from 5 to 35 parts of crystalline poly(vinyl methyl ether) and correspondingly from 95 to 65 parts of isotactic polypropylene.

4. Pressure-sensitive adhesive sheet material comprising a biaxially oriented film having uniform thickness and a tensile strength exceeding that of unoriented isotactic polypropylene, said film comprising an intimate blend of from 5 to 35 parts of crystalline poly(vinyl methyl ether) and correspondingly from 95 to 65 parts of isotactic polypropylene, and a layer of normally tacky and pressure-sensitive adhesive firmly united to one major surface of said film.

5. A uniform physical blend of polymers consisting essentially of from 95 to 85 parts of crystalline polypropylene and correspondingly from 5 to 15 parts of crystalline poly(vinyl methyl ether), a film formed from said blend being readily biaxially orientable to a product having sparkling clarity, uniform thickness on the order of 1 mil and a tensile strength in mutually perpendicular directions greatly exceeding that of unoriented isotactic polypropylene.

References Cited in the file of this patent

UNITED STATES PATENTS

| Re. 24,906 | Ulrich | Dec. 13, 1960 |
| 2,300,587 | Menger | Nov. 3, 1942 |

FOREIGN PATENTS

| 542,140 | Great Britain | Dec. 29, 1941 |
| 835,152 | Great Britain | May 18, 1960 |
| 572,425 | Belgium | Nov. 14, 1968 |